United States Patent [19]

Thelen

[11] Patent Number: 4,464,658

[45] Date of Patent: Aug. 7, 1984

[54] MULTIPOINT DATA COMMUNICATION SYSTEM WITH COLLISION DETECTION

[75] Inventor: William Thelen, Glen Ellyn, Ill.

[73] Assignee: AT&T Laboratories, Murray Hill, N.J.

[21] Appl. No.: 355,259

[22] Filed: Mar. 5, 1982

[51] Int. Cl.[3] .......................... H04Q 9/00; H04J 3/14
[52] U.S. Cl. .................................. 340/825.5; 370/16; 340/825.01; 455/8; 455/14
[58] Field of Search ...................... 340/825.01, 825.03, 340/825.5; 370/16, 67, 85; 455/8, 14

[56] References Cited

U.S. PATENT DOCUMENTS

| | | | |
|---|---|---|---|
| 4,032,893 | 6/1977 | Moran | 370/85 |
| 4,063,220 | 12/1977 | Metcalfe et al. | 340/147 |
| 4,128,883 | 12/1978 | Duke et al. | 364/200 |
| 4,161,786 | 7/1979 | Hopkins et al. | 364/900 |
| 4,228,496 | 10/1980 | Katzman et al. | 364/200 |
| 4,234,952 | 11/1980 | Gable et al. | 370/94 |
| 4,245,342 | 1/1981 | Entenmann | 370/16 |
| 4,245,344 | 1/1981 | Richter | 371/68 |
| 4,257,100 | 3/1981 | Syrbe et al. | 364/200 |
| 4,271,403 | 6/1981 | Severson et al. | 340/147 |
| 4,271,523 | 6/1981 | Gable | 371/57 |
| 4,276,643 | 6/1981 | Laprie et al. | 370/16 |
| 4,342,995 | 8/1982 | Shima | 340/825.5 |
| 4,380,061 | 4/1983 | Mori et al. | 370/16 |

OTHER PUBLICATIONS

International Search Report, International Searching Authority of the EPO, Hague Branch, Jun. 7, 1983.

*Primary Examiner*—Donald J. Yusko
*Attorney, Agent, or Firm*—D. Volejnicek; P. Visserman

[57] ABSTRACT

An improved multipoint access data communication system with collision detection provides a duplicative communication medium, network interface units adapted for connection to transceivers on both media, transceivers adapted for connection to a plurality of network interface units, and a local collision detection circuit associated with each transceiver for detecting collisions between transmissions simultaneously attempted by two or more network interface units connected to the transceiver.

47 Claims, 12 Drawing Figures

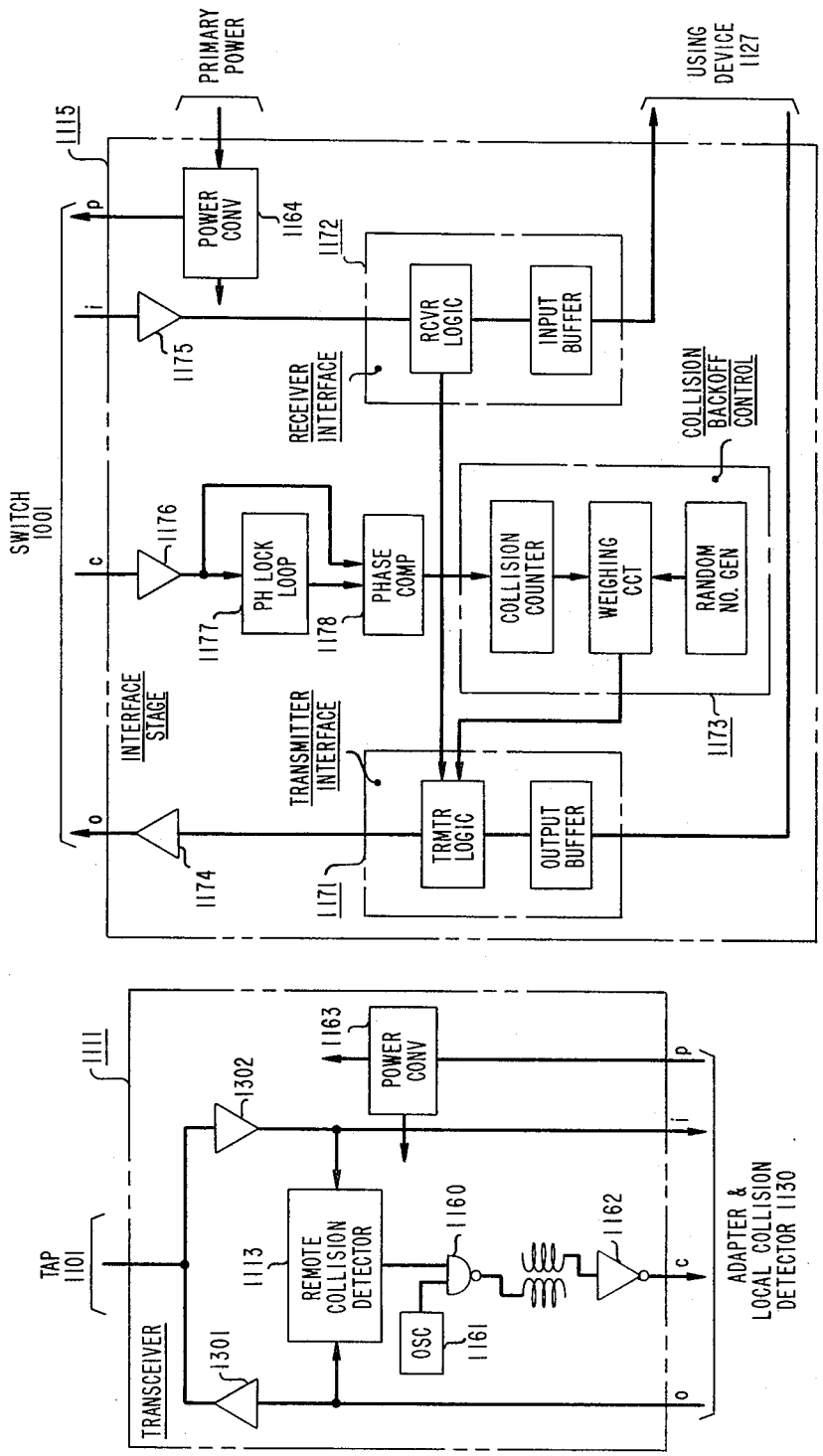

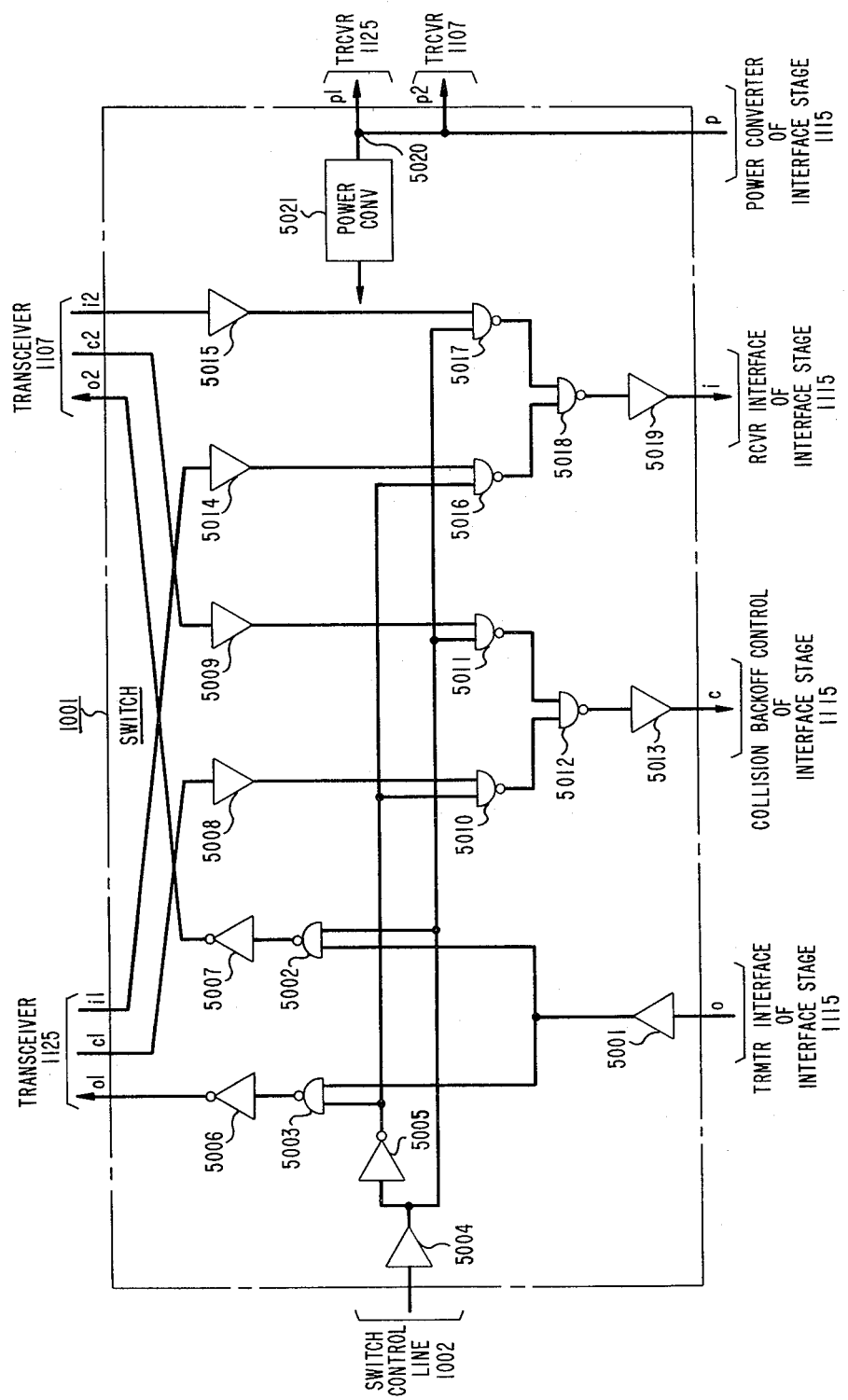

MULTIPOINT DATA COMMUNICATION SYSTEM WITH COLLISION DETECTION

CROSS-REFERENCE TO RELATED APPLICATION

The present application is related to an application for U.S. Letters Patent by C. F. Ault and K. F. Kocan entitled "Improved Multipoint Data Communication System with Local Access Arbitration", Ser. No. 355,258, which is being filed on the same day as this application and which is assigned to the same assignee. Both applications disclose in part the same matter but individually claim different inventive concepts.

TECHNICAL FIELD

This invention relates to data communication systems, and more particularly to multipoint access data communication systems with collision detection.

BACKGROUND OF THE INVENTION

Large scale computer systems typically have a number of component parts such as processors, storage devices, and input/output units, and data is regularly transferred among them during the execution of system tasks. In distributed processing systems, which generally employ several cooperating processors to perform system tasks, the problem of communications among the various units of the system can become very complex.

As distributed processing systems become widely used, attention is being given to standardizing the data communication systems which provide communications between the various parts that make up the distributed processing system. One type of communication system which has gained wide acceptance is the carrier sense multiple access-collision detect (CSMA-CD) type of system, exemplified by the Ethernet ®, a multipoint access data communication system with collision detection, which is substantially described in Metcalfe et al., U.S. Pat. No. 4,063,220.

The data communication system described by Metcalfe et al. comprises a bit-serial receiver-transmitter network which provides a communication path for a plurality of using devices, such as processors, storage devices, and input output units, that are connected to it. The network is centered around a communicating medium, such as a coaxial cable, to which a plurality of transceivers are tied for communicating across the medium. A plurality of corresponding using devices is connected to the plurality of transceivers by means of associated network interface stages. Each transceiver and interface stage combination constantly senses the data stream passing through the network, the interface stage constantly looking for data packets addressed to it, that is, to its associated using unit.

In addition to providing normal transmitting and receiving functions, the transceiver provides further control functions, utilized for aborting a transmission of data packets from the interface stage, when it senses a collision on the medium—herein also referred to as remote collision—of data transmitted by the associated and another interface stage. Also, the associated interface stage blocks its transmission of data when it senses the presence of other data on the medium.

While being advantageous from the standpoint of simplicity and versatility, conventional Ethernet-type data communication systems suffer from certain disadvantages that limit their application and usefulness. For example, such systems utilize a single communication medium, in terms of providing only a single communication path between any two using devices. The use of a simplex medium adversely affects the availability of the communication system: system reliability is low because the system is brought down by a single failure in the communication medium. Such fault sensitivity in turn dictates the use of a very reliable, and hence very expensive, communication medium to lower the probability of failure, which increases system cost. The use of a simplex medium also demands that the system be shut down to service the communication medium and to connect using units to the medium or to disconnect using units from the medium. Though devices for making in-service taps of the medium have been developed, they often provide connections to the medium which are of questionable reliability and may cause shorts in the medium which lower the medium's reliability.

Also in conventional Ethernet-type systems, each using device is connected to the communication medium at a separate tap via a dedicated transceiver and interface stage combination. Because of the deterioration of the medium's electrical characteristics caused by taps on the medium, the number of taps, and hence the number of using devices that can be connected to the medium, has been limited. Also, the use of a separate dedicated transceiver with each using device has made addition of using devices to the system costly. But, inter alia because of the way in which collision detection is accomplished in such systems—for example through a bit-by-bit comparison of signals transmitted and signals simultaneously detected by a transceiver on the medium—the use of a single transceiver to service more than one using device without radically altering the communications protocol has not been thought possible.

SUMMARY OF THE INVENTION

It is these and other disadvantages of the prior data communication systems that the present invention is directed to solve.

According to a first aspect of the invention, an improved data communication system includes a plurality of substantially duplicative communication media, a plurality of transceiver means each connected to at least one of the plurality of communication media, collision detection means associated with each transceiver means, and a plurality of means for interfacing using means and transceiver means, each interface means connected to at least one of the plurality of transceiver means such that the associated using means have communication access via the transceiver means to the plurality of communication media.

Preferably, each one of the transceiver means is connected to one of the plurality of communication media, and each of the interface means is connected to a plurality of transceiver means each one of which is connected to a different one of the communication media. Preferably the number of communication media utilized is two.

According to a second aspect of the invention, a data communication system which includes a communication medium, a plurality of transceiver means connected to the medium, and remote collision detection means associated with each transceiver means, comprises at least one transceiver means adapted to be concurrently interfaced for communication with a plurality of using means.

Preferably, the data communication system also comprises local collision detection means associated with the at least one transceiver means for detecting a collision between communications of a plurality of using means interfaced to that transceiver means. Preferably, the local collision detection means include means for preventing locally originating contemporaneous communications from physically colliding.

Also, the using means are preferably interfaced for communication to the transceiver means by a plurality of interface means which are connected to the plurality of transceiver means, and the at least one transceiver means is adapted for concurrent connection to a plurality of the interface means. Likewise, the remote and local collision detection means associated with the at least one transceiver means are preferably adapted for concurrent connection to the plurality of the interface means.

Preferably, the two above-described aspects of this invention may be combined, such that an improved data communication system has a plurality of substantially duplicative communication media, a plurality of transceiver means each connected to one of the plurality of communication media, remote collision detection means associated with each transceiver means, a plurality of means for interfacing using means and transceiver means, each connected to a plurality of transceiver means each one of which is connected to a different one of the communication media, such that the using means has selective communication access to the plurality of communication media, and means associated with at least one of the transceiver means for adapting it for concurrent connection to a plurality of interface means. Preferably this communication system also comprises local collision detection means associated with the at least one transceiver means for detecting collisions between communications of a plurality of using means interfaced to that transceiver means, and preferably the local collision detection means include means for preventing locally originating contemporaneous communications from physically colliding.

The above-described improvements to the data communication system have numerous advantages.

By providing plural communication media, system availability is drastically improved. System reliability is heightened because a failure of a single communication medium will no longer bring the system down: as long as at least one communication medium is functional, the system can remain in operation. Because a failure of a communication medium can be tolerated by the system, individually less reliable, and hence much cheaper, communication media can be utilized in the system, thus lowering the system cost vis-a-vis the value of the improvement in system reliability. System reliability is also increased because the plurality of communication media provide the system with greater error detection capability, for example by allowing a single communication to proceed simultaneously across more than one communication medium and then voting on the plurality of received communications at the destination, or by dedicating one of the communication media for use as a maintenance channel, and/or a network administration channel. Briefly described, this latter function includes the ability to accumulate traffic counts, the ability to change system configuration, and the ability to routinely diagnose parts of the system and to receive reports back using this second channel.

System down-time is also decreased because the system need not be shut down for communication medium maintenance, or for system modifications. For example, if a communication medium needs to be repaired because it has failed, or if using devices need to be connected to or disconnected from the medium, system communications are merely switched over to one of the other communication media and work can now proceed on the previously utilized medium.

Enabling a plurality of using devices to share a single transceiver in common reduces the number of transceivers and associated hardware that must be used in the system, thereby providing a significant improvement in the cost of the system. The savings obtained by a reduction, by a given factor, in the number of transceivers used can often more than compensate for the cost of increasing the number of duplicative media by the same factor, thereby resulting in an improved system that is vastly more reliable, yet cheaper, than a system not utilizing these inventive improvements. The combination of two or more buses and transceivers adapted to be shared by a plurality of using devices may be optimized for any particular application, thus trading cost and traffic considerations against reliability. Furthermore, this tradeoff may be made on a subnetwork basis, at each tap on the communication medium: for example, a key processor could use two buses but not share a transceiver with any other unit, while a large number of terminal processors could share a single transceiver.

As was mentioned above, each transceiver is conventionally connected to the communication medium at a separate tap, and the taps cause deterioration of the electrical characteristics of the medium. The inventive reduction in the number of transceivers used therefore improves the electrical characteristics of the medium by decreasing the number of taps. Alternatively, the maximum number of using devices that can be connected to the communication medium without deteriorating medium characteristics below a usable minimum is increased, because no longer does each using device require a separate tap.

Furthermore, because the connection to or disconnection from a transceiver of one or more using devices does not affect the electrical characteristics of the communication medium to which the transceiver is connected, in-service changes of the system at any transceiver location can be easily made.

These and other advantages of the invention will become apparent during the following description of an illustrative embodiment of the invention taken together with the drawing.

BRIEF DESCRIPTION OF THE DRAWING

FIG. 2 is a logic diagram of a transceiver block of FIG. 1;

FIG. 3 is a logic diagram of an interface stage block of FIG. 1;

FIG. 12 is a logic diagram of a bus switch block of FIG. 1.

DETAILED DESCRIPTION

The illustrative embodiment of the present invention is an improvement to the Ethernet-type communication system disclosed in Metcalfe et al., U.S. Pat. No. 4,063,220. The disclosure of that patent is incorporated herein by reference.

Figure 1:
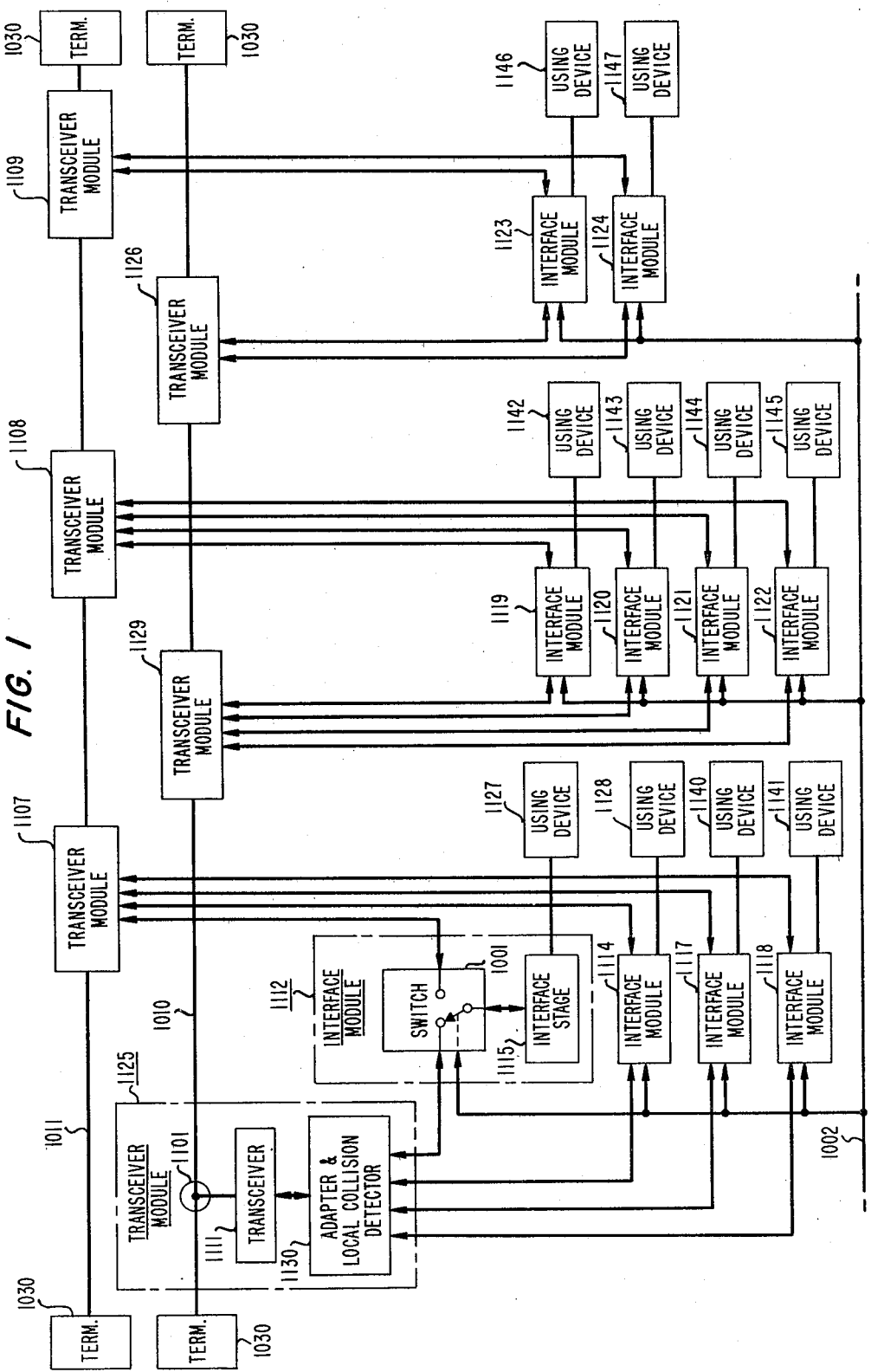
FIG. 1 is a block diagram of an illustrative communication system constructed according to the present invention.

Referring now to the drawing, FIG. 1 shows a block diagram of the illustrative communication system constructed according to the present invention.

The communication system is centered around two buses 1010 and 1011, each of which serves as a communication medium of the system. Each bus 1010, 1011 comprises a coaxial cable. The two buses 1010, 1011 are substantially duplicative, images of each other. Each of the buses 1010, 1011 substantially corresponds to the bus 10 of Metcalfe et al. Each end of each bus 1010, 1011 is terminated in a terminator 1030. The terminators 1030 are akin to the terminators 30 of Metcalfe et al. Distributed along the bus 1010 are a plurality of transceiver modules 1129, 1125, 1126. Similarly distributed along the bus 1011 are a plurality of transceiver modules 1107, 1108, 1109.

In the example of FIG. 1, each transceiver module is adapted for connection to four interface modules, though it need not be connected to as few or as many as four, and each interface module is adapted for connection to two transceiver modules. Each interface module is connected to one transceiver module on the bus 1010 and to one transceiver module on the bus 1011. Thus the transceiver modules 1125 and 1107 are shown each connected to four interface modules 1112, 1114, 1117, and 1118; the transceiver modules 1129 and 1108 are shown each connected to four interface modules 1119, 1120, 1121, and 1122; and the transceiver modules 1126 and 1109 are shown each connected to only two interface modules 1123 and 1124.

A using device is in turn connected to each of the interface modules: device 1127 to the module 1112, device 1128 to the module 1114, device 1140 to the module 1117, device 1141 to the module 1118, device 1142 to the module 1119, device 1143 to the module 1120, device 1144 to the module 1121, device 1145 to the module 1122, device 1146 to the module 1123, and device 1147 to the module 1124.

A using device can be any device desired to be connected to the data communications system for communication. For example, it can be a data processor, an I/O terminal, a mass storage device, or an external data communication link.

The system configuration shown in FIG. 1 can be varied at will: using devices and their associated network interface modules can be added to or deleted from the system to reconfigure it, and additional transceiver modules may be added to the system to increase its capacity.

The communication system shown in FIG. 1 can also be interconnected, through repeaters (not shown) to another similar communication system (not shown). Two repeaters would be required for such interconnection, one repeater to connect bus 1011 to its counterpart in the second communication system, in a manner shown in FIG. 1 of Metcalfe et al., and the second repeater to connect bus 1010 to its counterpart in the second communication system, in a similar manner.

All of the transceiver modules of FIG. 1 are substantially identical. Representative of them is the transceiver module 1125, which includes a tap 1101, a transceiver 1111, and an adapter and local collision detector stage 1130. The transceiver 1111 is substantially like the transceiver 111 of Metcalfe et al., and includes a transmitter 1301, a receiver 1302, and a remote collision detector 1113, as shown in FIG. 2. These elements of the transceiver 1111 are AC-coupled to the bus 1010 (see FIG. 5 of Metcalfe et al.) to provide ground isolation for the bus 1010 from the system circuitry. The transceiver 1111 is connected for communications to the bus 1010 by the tap 1101, which is substantially like the tap 101 of Metcalfe et al. The local collision detector and adapter stage 1130 is connected to the transceiver 1111 and adapts it for concurrent connection to a plurality of interface modules 1112, 1114, 1117, 1118. The local collision detector and adapter stage 1130 is discussed in more detail below in conjunction with FIGS. 4–11.

All of the interface modules are also substantially the same. Their function is to interface the using devices to the transceiver modules for communication; therefore, their organization depends in part upon the type of using device they are interfacing. As shown in FIG. 1, the interface module 1112, taken as representative of all the interface modules, includes an interface stage 1115 and a bus switch 1001. The interface stage 1115 is substantially like the interface stage 115 or 116 of Metcalfe et at., and includes a transmitter interface 1171, a receiver interface 1172, and a collision backoff control 1173, as shown in FIG. 3. For an interface stage akin to the stage 116 of Metcalfe et al, the collision backoff control 1173 is merely a straight-through connection. The interface stage 1115 has connected to it the using device 1127. It is in turn selectively connected for communications to the two transceiver modules 1125, 1107 by the switch 1001. Thus the interface stage 1115 can interface the device 1127 selectively to the transceiver module 1125 or 1107, for communications on the bus 1010 or 1011, respectively. The other using devices are similarly interfaced for communications by their interface modules. The switches in all of the interface modules are connected to a common switch control line 1002 which controls the switches commonly, in unison. The switch 1001 is discussed in greater detail below in conjunction with FIG. 12.

Figure 4:
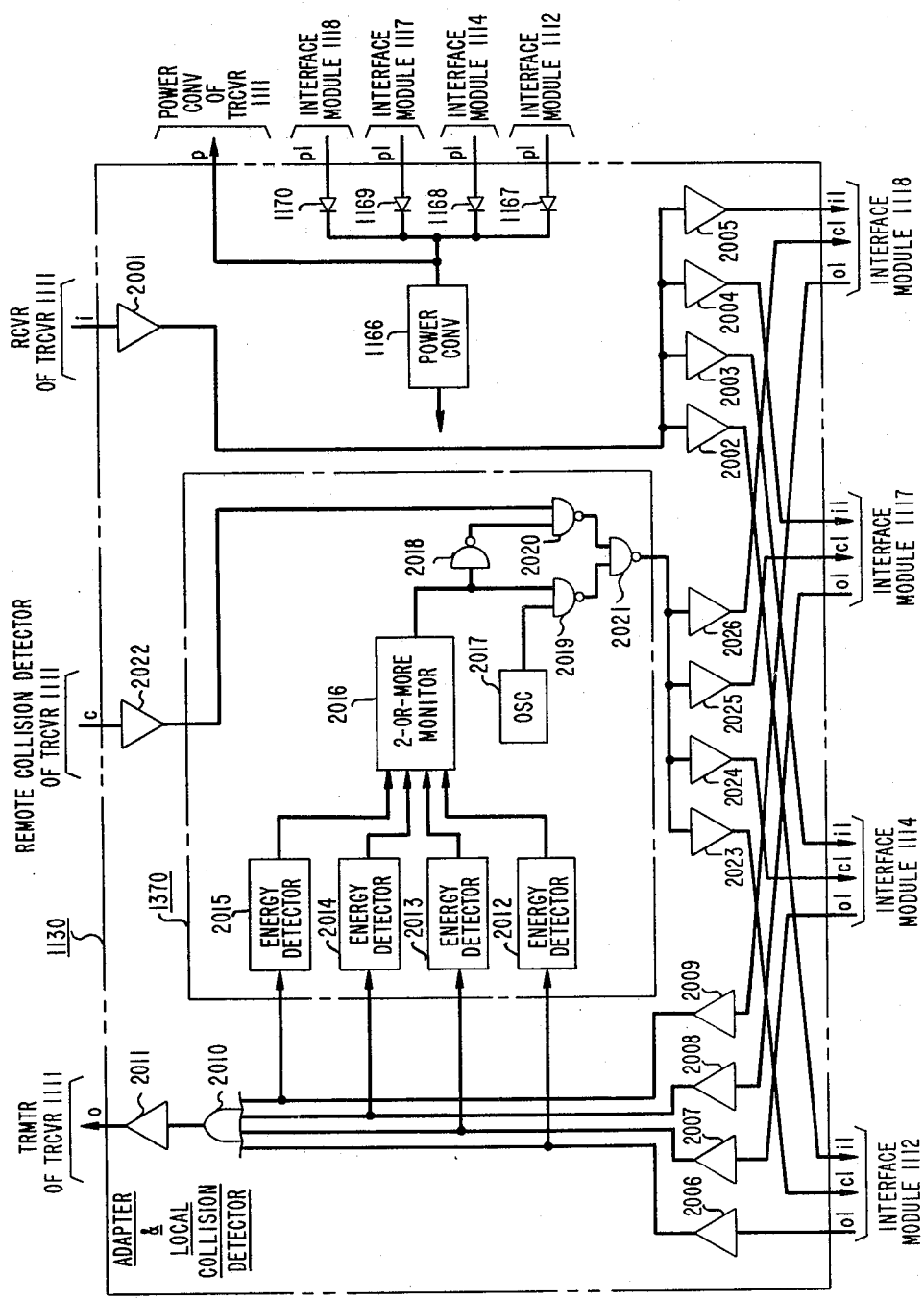
FIG. 4 is a logic diagram of a first embodiment of an adapter and local collision detector block of FIG. 1.

Turning now to FIG. 4, there is shown a logic diagram of a first embodiment of the local collision detector and adapter stage 1130 of the transceiver module 1125. The stage 1130 is representative of the local collision detector and adapter stages of the other transceiver modules and therefore only the one stage will be discussed.

The stage 1130 adapts the transceiver 1111 for concurrent connection to the plurality of the interface modules 1112, 1114, 1117, 1118, by fanning out the transceiver's inputs and outputs to the plurality of outputs and inputs of those interface modules. The stage 1130 also detects local collisions, which are communications, transmissions, attempted contemporaneously by a plurality of the interface units which are connected to that transceiver 1111. The stage 1130 is connected to the "i", "o", and "c" lines of the transceiver 1125, (see FIG. 2) and to the "o1", "i1", and "c1" lines of both the switch 1001 (see FIG. 12) of the interface module 1112 and the switches of the interface modules 1114, 1117, and 1118 (see FIG. 1). All of these lines, and other lines discussed hereafter, are preferably twisted pairs of insulated wire.

The line "i" which leads from the output of the receiver 1302 (see FIG. 2) is terminated at the input of a line receiver 2001. The line receiver 2001, as well as other line receivers and line drivers referred to below, are standard commercially available units, such as the device 10116 manufactured by Motorola, Inc. of Phoenix, Ariz. The line receiver 2001 regenerates signals present on the "i" line and uses the regenerated signals to drive the inputs of line drivers 2002, 2003, 2004, and 2005. The output of each of the line drivers 2002, 2003, 2004, and 2005 in turn drives the "i1" line of one of the interface modules 1112, 1114, 1117, and 1118, respectively. The output of the receiver of any other transceiver module is similarly fanned out to each of the interface modules connected to that transceiver module.

The lines "o1" from the four interface modules 1112, 1114, 1117 and 1118 are terminated in the inputs of line receivers 2006, 2007, 2008, and 2009, respectively. The outputs of the line receivers 2006, 2007, 2008, and 2009 are connected to the inputs of a conventional "OR" circuit 2010 which combines their outputs onto a single output that forms the input to a line driver 2011. The output of the line driver 2011 is connected to the line "o" which leads to the input of the transmitter 1301 (see FIG. 2). The input to the transmitter of any other transceiver module is similarly fanned out to each of the interface modules connected to that transceiver module.

The outputs of the line resceivers 2006, 2007, 2008, and 2009 are also tapped for use by the local collision detection circuit 1370 of the adapter and local collision detector 1130. As shown in FIG. 4, the output of each of those four line receivers is connected to the input of one of four energy detectors 2012, 2013, 2014, and 2015, respectively. Each of the energy detectors monitors the output of the associated line receiver and outputs a high signal when it senses the presence of a significant amount of energy, signifying a transmission, on the output of the associated line receiver.

Figure 5:
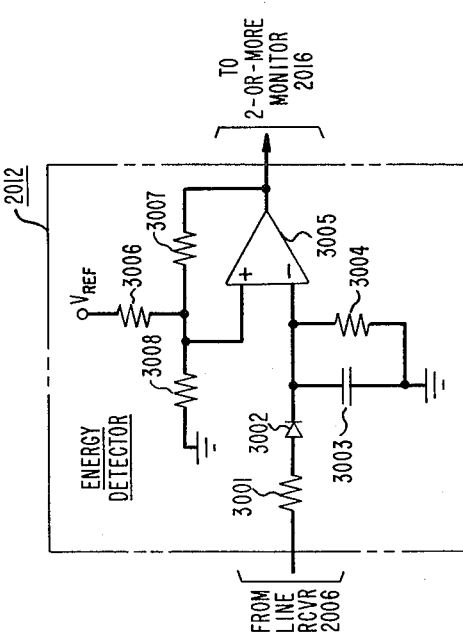
FIG. 5 is a circuit diagram of an energy detector block of FIG. 4.

All of the energy detectors are the same. The circuit diagram of the representative energy detector 2012 is shown in FIG. 5. The energy detector 2012 taps the output of the line receiver 2006 across a current-limiting resistor 3001. A diode 3002 allows the energy tapped from the line receiver's output to charge a lossy integrator comprised of a capacitor 3003 and a resistor 3004. The integrated signal is input into a conventional comparator 3005. The second input to the comparator 3005 is a reference signal, derived from a reference voltage $V_{REF}$ through a voltage divider comprised of resistors 3006 and 3008. Negative feedback across a resistor 3007 is provided to the second input of the comparator 3005 from the comparator's output to provide hysteresis. The comparator 3005 compares the integrated sampled signal with the reference signal. When the integrated input signal voltage exceeds the voltage of the reference signal, indicating the occurrence of a transmission at the output of the line receiver 2006, the comparator 3005 outputs a signal indicative of that fact.

Returning to FIG. 4, the outputs of the four energy detectors 2012, 2013, 2014, and 2015 are connected to the inputs of a "two-or-more" detector 2016. The "two-or-more" detector 2016 monitors the outputs of the four energy detectors and generates a high signal at its own output whenever it sees "energy detected" high signals concurrently at the outputs of two or more of the four associated energy detectors. As will be shown later, the output signal of the "two-or-more" detector 2016 is indicative of a local collision, that is, of a simultaneous attempt by two or more of the interface modules 1115, 1114, 1117 and 1118 to transmit to the transceiver module 1125.

Figure 6:
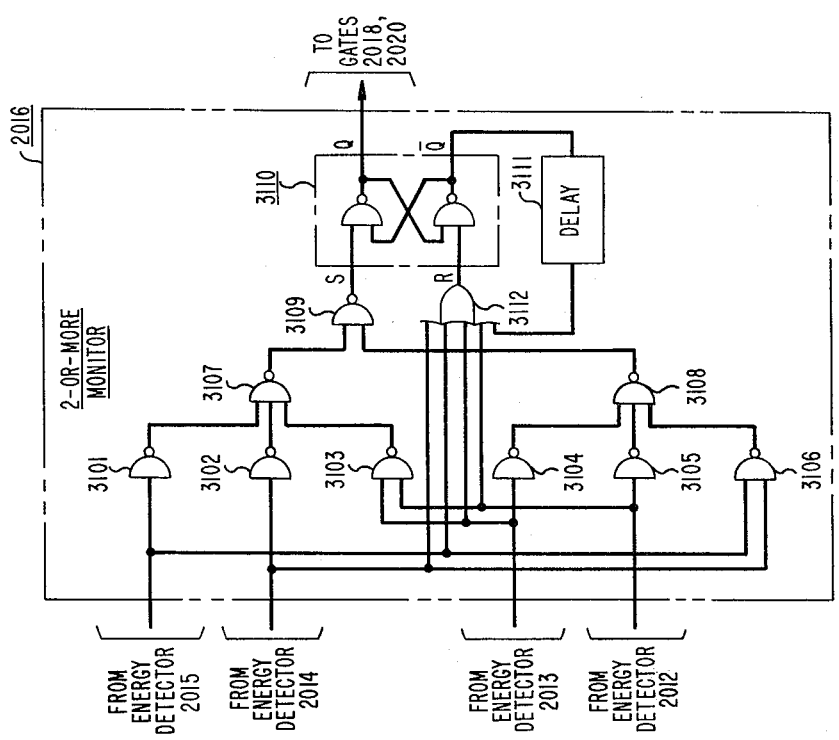
FIG. 6 is a logic diagram of the two-or-more monitor block of FIG. 4.

A logic diagram of the two or more detector circuit 2016 is shown in FIG. 6. The detector circuit 2016 is representative of all other detector circuits in the system and therefore only the one detector circuit 2016 will be described. The output of the energy detector 2015 is connected to one input of a conventional "NAND" gate 3016 of the monitor 2016 and to the input of a conventional inverter 3101. The output of the energy detector 2014 is connected to the input of an inverter 3102 and to the second input of the gate 3106. The output of the energy detector 2013, is similarly connected to the input of an inverter 3104 and to one input of a "NAND" gate 3103. And the output of the energy detector 2012 connects to the input of an inverter 3105 and to the second input of the gate 3103. The outputs of the gates 3101, 3102 and 3103 form inputs to the "NAND" gate 3107, and the outputs of the gates 3104, 3105, and 3106 form inputs to the "NAND" gate 3108. In turn, the outputs of gates 3107 and 3108 connect to the inputs of a "NAND" gate 3109.

The output of the gate 3109 connects to the S input of a collision flip-flop 3110, which is a conventional R/S flip-flop comprised of a pair of "NAND" gates. The $\overline{Q}$ output of the collision flip-flop 3110 is connected across a delay line 3111 to an input of an "OR" gate 3112. The outputs of the four energy detectors 2012–2015 form the other inputs on the gate 3112. The output of the gate 3112 is connected to the R input of the collision flip-flop 3110.

The operation of the circuit of FIG. 6 is as follows. When one or none of the energy detectors 2012, 2013, 2014, 2015 have a high signal present at their outputs, the output of the gate 3109 is high. The high signal on the output of the gate 3109 causes a low signal to be present at the Q output of the collision flip-flop 3110, indicating, the absence of a local collision. The $\overline{Q}$ output of the flip-flop 3110 is high, and therefore the R input of the flip-flop 3110 is also high. With R high, the flip-flop 3110 can set but cannot reset.

When two or more of the energy detectors 2012–2015 have a high signal present at their outputs, the output of the gate 3109 is low. The low signal on the output of the gate 3109 causes the flip-flop 3110, to set and a high signal to be present at the Q output of the collision flip-flop 3110 indicating the occurrence of a local collision. The $\overline{Q}$ output of the flip-flop 3110 is low; however, the R input of the flip-flop 3110 is high because one or more of the signals to the gate 3112 are high and also because, for the duration of the time delay after the $\overline{Q}$ output goes low, the output of the delay 3111 will remain high.

When outputs of all, or all but one, of the energy detectors 2012–2015 drop low, the output of the gate 3109 goes high, tending to reset the flip-flop 3110 by changing the output Q of the flip-flop 3110 to low and the output $\overline{Q}$ to high. If the output of one of the entry detectors 2012-2015 remains high, however, the R input of the flip-flop 3110 remains high and the flip-flop 3110 is prevented from resetting. Also, if the outputs of all of the energy detectors 2012-2015 go low during the time delay period following the setting of the flip-flop 3110, the delay 3111 insures that the R input to the flip-flop 3110 will remain high and thus prevents the flip-flop 3110 from changing its state until the time delay period has expired. Only if the reset has occurred after the expiration of the time delay period following the setting of the flip-flop 3110, so that the low state of the $\overline{Q}$ output has propagated through the delay 3111 to the gate 3112, is the flip-flop 3110 enabled to reset immediately. Thus the delay 3111 insures that once a local collision has occurred, a "collision detected" high output signal remains on the Q output of the flip-flop 3110 for at least a period of time equal to the duration of the time delay period. When the delay expires and all transmissions cease, the flip-flop 3110 is allowed to change state in response to the high signal present at its S input, sending its Q output low and its $\overline{Q}$ output high again.

Prolonging thus the minimum duration of the local "collision detected" signal enables all tasks of the protocol associated with the occurrence of a collision to be acted upon before the collision ceases to be detected.

Referring to FIG. 2, line "c", which leads to the remote collision detector 1113 is not connected directly to the remote collision detector's output. The reason is that the output signal of the remote collision detector 1113 is a direct current signal (see Metcalfe et al.) which is not particularly suited for transmission over the distances between the transceiver module 1125 and the interface module 1112 that interconnections via twisted pairs permit. The DC output signal of the remote collision detector 1113 is therefore converted into an AC signal. The output of the remote collision detector 1113 is input into a "NAND" gate 1160 along with the output of an oscillator 1161 which preferably has a frequency of 10 MHz. The output of the gate 1160 is AC-coupled to the input of a line driver 1162, whose inverted output is connected to the line "c". The result is that no signals appear on the line "c" when the output of the remote collision detector 1113 is low, but signals of the oscillator 1161 frequency are sent on the line "c" when the output of the remote collision detector 1113 is high.

In systems where the output of the remote collision detector is a digital signal, the additional gate 1160 and oscillator 1161 are not utilized. Instead, the output of the remote collision detector is AC-coupled directly to the line driver 1162, and the line driver's standard, non-inverted, output is connected to the line "c".

Returning again to FIG. 4, the line "c" from the transceiver 1125 is terminated in the input of a line receiver 2022. The output of the line receiver 2022 is connected to one input of a "NAND" gate 2020.

The output of the two-or-more monitor 2016 is connected to an inverter 2018, whose output is connected to a second input of the gate 2020. The output of the two-or-more monitor 2016 is also connected, along with the output of an oscillator 2017 which has the same frequency as the oscillator 1161, to the inputs of a "NAND" gate 2019. The output of the gates 2019 and 2020 are connected to the inputs of a "NAND" gate 2021. The output of the gate 2021 in turn connects to the inputs of line drivers 2023, 2024, 2025, and 2026, whose outputs connect to the "c1" lines of interface modules 1112, 1114, 1117, and 1118.

The output signal of the two-or-more monitor 2016 is a DC signal, and it acts as a controller of the gate 2020: when the output signal of the monitor 2016 is low, indicating the absence of a local collision, the signal from the remote collision detector 1113 is allowed to pass through the gates 2020 and 2021 onto the lines "c1". But when the output signal of the monitor 2016 is high, indicating the presence of a local collision, the signal from the remote collision detector 1113 is blocked at the gate 2020, the output signal of the monitor 2016 allows a signal from the oscillator 2017 to pass through the gate 2019 to indicate the presence of a local collision, and this oscillator signal is then allowed to pass through the gate 2021 onto the lines "c1".

The above-described logic configuration is such that signals from the remote collision detector 1113 are fanned out onto the lines "c1" when local collision is not detected, but when a local collision is detected, the signals from the detector 1113 are blocked and signals from the local collision oscillator 2017 are fanned out onto the lines "c1".

Each set of the three lines "i1", "o1", and "c1" from the adapter and local collision detector 1130 of the transceiver module 1125 connects to a bus switch in one of the interface modules 1112, 1114, 1117, and 1118. Should fewer than four interface modules be connected to the transceiver module 1125, as is the case for the transceiver modules 1126 and 1109, the "i1", "o1", and "c1" lines intended for the absent interface module are simply left unconnected.

Figure 8:
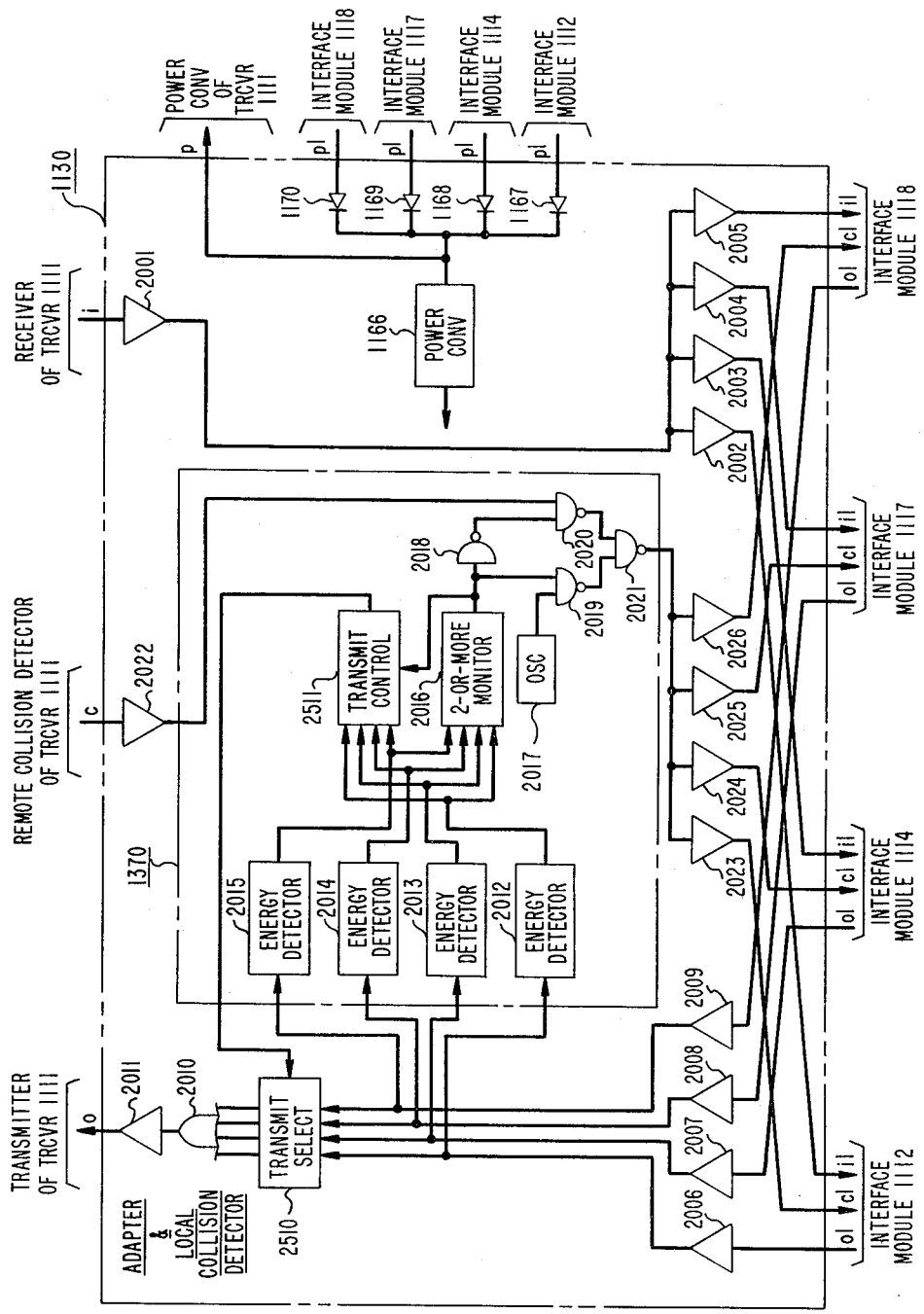
FIG. 8 is a logic diagram of a second embodiment of an adapter and local collision detector block of FIG. 1.

While the above-described embodiment of the adapter and local collision detector stage 1130, shown in FIG. 4, allows a local collision to occur, and the resulting garbled transmission to be broadcast over the communication medium, a second embodiment of the circuit 1130, shown in block diagram form in FIG. 8, prevents local collision from physically, though not from logically, occurring. This implementation primarily holds advantages for systems which utilize protocols associated with collision detection that are more complex than the protocol of Metcalfe et al., for example for those that require a "collision detected" signal to be broadcast over the communication medium after a collision has been sensed.

As FIG. 8 shows, this second embodiment of the circuit 1130 adds to the circuit of FIG. 4 a transmission selector 2510 and a transmission controller 2511. The transmission selector 2510 allows a transmission from only one of the using units 1127, 1128, 1140, and 1141 to enter the transceiver 1111 at any one time. The transmission controller 2511 controls the operation of the transmission selector 2510 and dictates to it which transmission will be allowed to pass therethrough.

Figure 9:
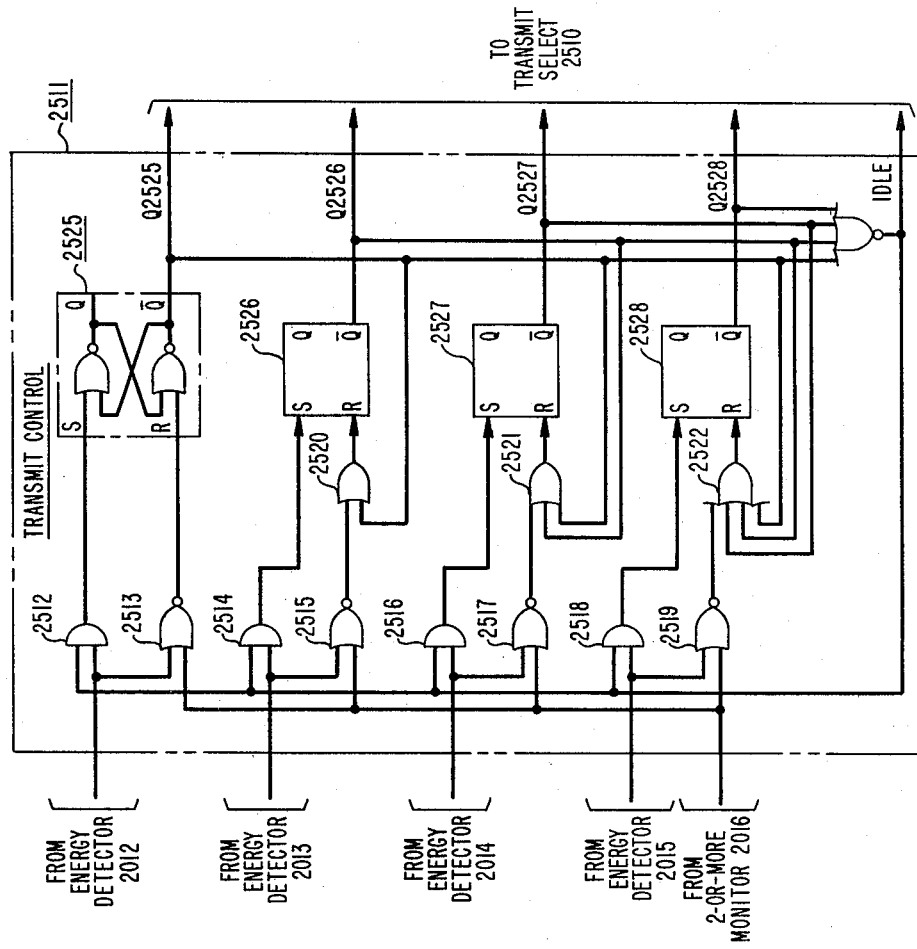
FIG. 9 is a logic diagram of the transmission controller block of FIG. 8.

The logic diagram of the transmission controller 2511 is shown in FIG. 9. The controller 2511 has as its inputs the outputs of the four energy detectors 2012, 2013, 2014, and 2015 and the output of the two-or-more monitor 2016. The output of the energy detector 2012 forms first inputs to a conventional "AND" gate 2512 and to a conventional "NOR" gate 2513. A second input of the gate 2513 is connected to the output of the two-or-more monitor 2016. The outputs of the gates 2512 and 2513 form the S and R inputs, respectively, to a transmit flip-flop 2525 which is a conventional R/S flip-flop comprised of two "NOR" gates.

The output of the energy detector 2013 forms first inputs to an "AND" gate 2514 and a "NOR" gate 2515; a second input of the gate 2515 is also connected to the output of the monitor 2016. The output of the gate 2515 is connected to one input of a conventional "OR" gate 2520, whose second input is connected to the Q output of the transmit flip-flop 2525. The outputs of the gates 2514 and 2520 connect to the S and R inputs, respectively, of a transmit flip-flop 2526.

The outputs of the energy detector 2014 forms first inputs to an "AND" gate 2516 and a "NOR" gate 2517. A second input of the gate 2517 is again connected to the output of the monitor 2016. The output of the gate 2517 is connected to one input of an "OR" gate 2521, whose second and third inputs are connected to the Q outputs of the flip-flop 2525 and 2526. The outputs of the gates 2516 and 2521 are connected to the S and R inputs, respectively, of a transmit flip-flop 2527.

Finally, the output of the energy detector 2015 forms first inputs to an "AND" gate 2518 and a "NOR" gate 2519. A second input of the gate 2519 is connected to the output of the monitor 2016. The output of the gate 2519 is connected to one input of an "OR" gate 2521, whose second, third, and fourth inputs are connected to the Q outputs of the flip-flops 2525, 2526, and 2527. The outputs of the gates 2518 and 2522 form S and R inputs, respectively, to a transmit flip-flop 2528.

The outputs of the four transmit flip-flops 2525, 2526, 2527, and 2528, also form the inputs of an idle gate 2529, which is a conventional "NOR" gate whose output forms a second input to the gates 2512, 2514, 2516, and 2518. While the outputs of all four energy detectors are low, indicating an idle condition in which no local transmissions are occurring, the output of the idle gate 2529 is high to reflect this fact.

The circuit of the transmission controller 2511 of FIG. 9 is such that the output of a transmit flip-flop is low for as long as the output of the associated energy detector and of the monitor 2016 is low.

When the output of one of the energy detectors goes high, indicating that one local transmission is occurring, the output of the associated transmit flip-flop also goes high. This causes the output of the idle gate 2529 to go low, thereby causing the outputs of the other three transmit flip-flops to be clamped low for as long as the output of the one transmit flip-flop is high. When the output of the one detector goes low again, the output of the associated transmit flip-flop drops to low, causing the output of the idle gate 2529 to become high, and the idle state is resumed.

Should the output of a second energy detector go high while the output of the one energy detector is still high, the output of the two-or-more monitor 2016 would go high to indicate the occurrence of a local collision. The presence of a high signal on the output of the monitor 2016 clamps the outputs of the four transmit flip-flops to whatever state they were in when the two-or-more monitor's output went high, and the outputs of the four transmit flip-flops are prevented from changing their state for as long as the output of the monitor 2016 is high, irrespective of the state, or change in state, of the outputs of the energy detectors. When the output of the monitor 2016 goes low, the four transmit flip-flops are again enabled to respond to the state of the outputs of their associated energy detectors.

Two or more of the transmit flip-flops 2525 to 2528 can be set high concurrently only if the outputs of their respective energy detectors go high substantially simultaneously—within a time interval of one gate delay, which is approximately 5 nanoseconds. While extremely unlikely, this condition is nevertheless corrected by the inclusion of the gates 2520, 2521, and 2522. These gates serve to give the flip-flop 2525 priority over the other three transmit flip-flops, the flip-flop 2526 priority over the flip-flops 2527 and 2528, and the flip-flop 2527 priority over the flip-flop 2528. For example, if the outputs of the energy detectors 2013 and 2015 went high at the same time, the Q outputs of both the flip-flops 2526 and 2528 would tend to go high, but the flip-flop 2528 would substantially immediately be caused to clamp low, allowing only the output of the flip-flop 2526 to remain high.

Figure 10:
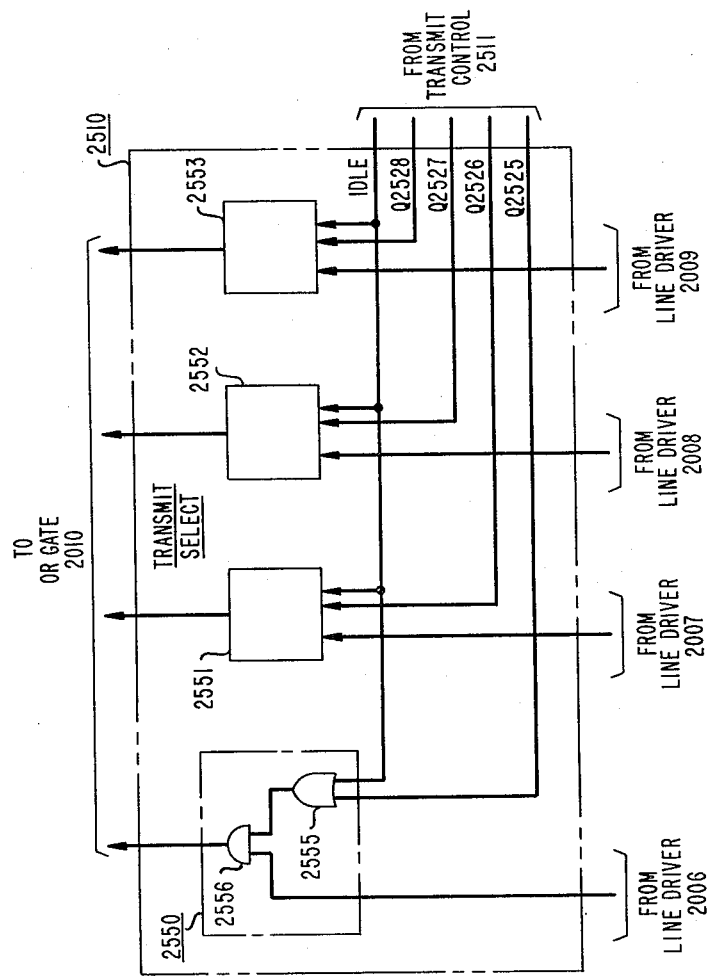
FIG. 10 is a logic diagram of the transmission selector block of FIG. 8.

The logic diagram of the transmission selector 2510 is shown in FIG. 10. The selector 2510 has as its inputs the Q outputs of the transmit flip-flops 2525–2528, and the outputs of the line drivers 2006–2009. The selector 2510 includes four identical selector gate circuits 2550–2553. As shown for the gate selector circuit 2550, it is made up of an "OR" gate 2555 and an "AND" gate 2556. The output of the line driver 2006 connects to one input of the gate 2556. The outputs of the transmit flip-flop 2525 and of the idle gate 2529 form the inputs to the gate 2555, whose output forms the second input of the gate 2556. Similarly, the outputs of the line driver 2007, the transmit flip-flop 2526, and the idle gate 2529 form the inputs of the selector gate circuit 2551; the outputs of the line driver 2008, the transmits flip-flop 2527, and the idle gate 2529 form the inputs of the selector gate circuit 2552, and the outputs of the line driver 2009, the transmits flip-flop 2528, and the idle gate 2529 form the inputs of the selector gate circuit 2553.

The outputs of the selector gate circuits 2550–2553 are connected to the inputs of the "OR" gate 2010. (See FIG. 8.) The operation of each selector gate circuit is such that signals at the associated line driver are blocked from reaching the gate 2010 unless either the output of the idle gate 2529 or the output of the associated transmit flip-flop are high.

The operation of the transmission selector 2510, under the control of the transmission controller 2511, is as follows. When no local transmissions are occurring, the high output of the idle gate 2529 causes the outputs of all four line drivers 2006–2009 to be connected to the gate 2010.

When a single local transmission occurs, for example at the line driver 2006, the output of the idle gate 2529 goes low and the output of the transmit flip-flop 2525 goes high while the outputs of the other transmit flip-flops are clamped low. Thus, connections between the outputs of the line drivers 2007–2009 and the inputs of the gate 2010 are broken at the selector gate circuits 2551–2553, and the one local transmission is allowed to pass from the output of the line driver 2006 to the gate 2010.

Should a second local transmission appear during this time at one of the other line drivers 2007–2009, it would be prevented by the selector gate circuits 2551–2553 from reaching the gate 2010 and physically colliding with the first local transmission.

The output of the driver 2006 remains connected to the input of the gae 2010 for as long as the first transmission is taking place, or for as long as the output of the two-or-more monitor 2016 remains high, whichever is later. Thereafter, through connections to the gate 2010 are reestablished by all four of the selector gate circuits 2550–2553.

Thus, it can be seen that a local collision is prevented from physically occurring on the coax bus by the adapter and local collision detector 1130 of FIG. 8. While a logical local collision can still occur, in that two or more using units sharing a common transceiver module can attempt to transmit contemporaneously, a physical local collision, in terms of two attempted local transmissions mixing with each other to result in a garbled transmission being transmitted over the communication medium, cannot occur.

Figure 11:
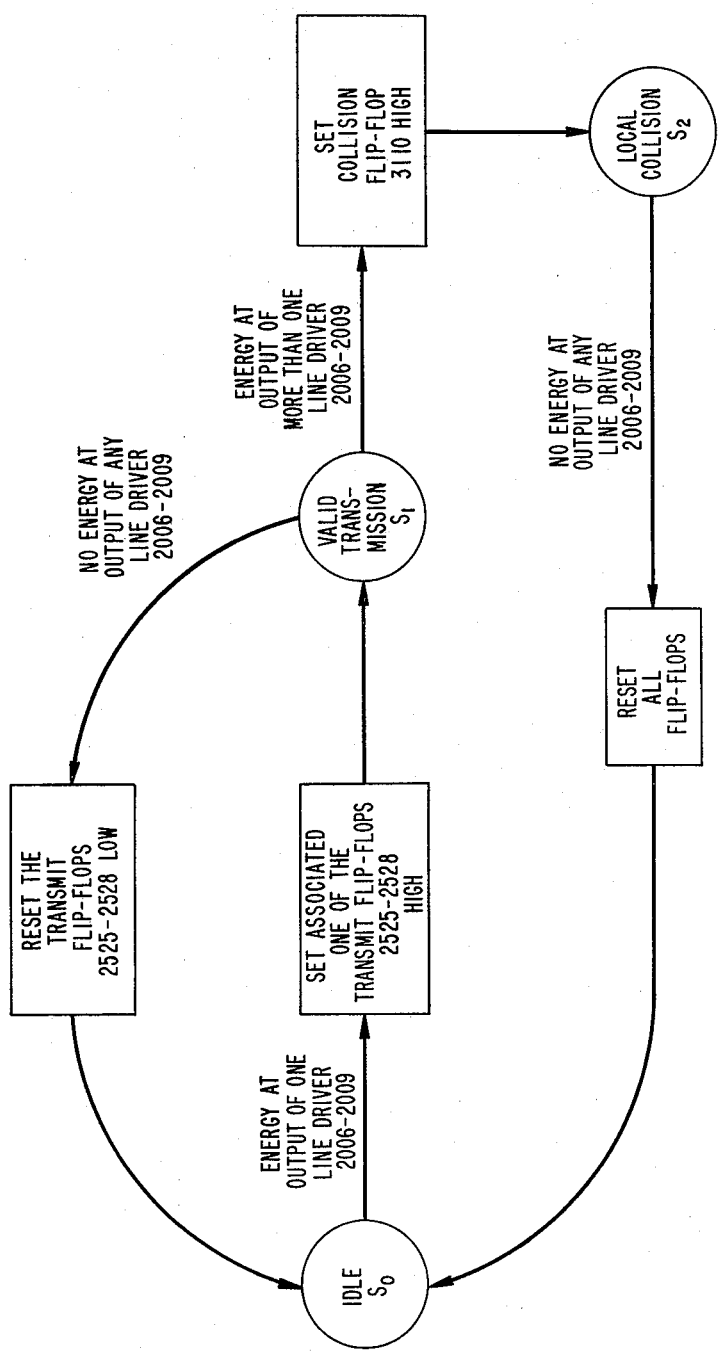
FIG. 11 is a state diagram of the local collision detector of FIG. 8.

The operation of the adapter and local collision detector 1130 of FIG. 8 is diagramed in the state diagram of FIG. 11. That diagram shows that the adapter and local collision detector 1130 has three states: an idle state $S_0$, a valid transmission state $S_1$, and a local collision state $S_2$. The adapter and local collision detector 1130 is in the idle state $S_0$ when no local transmissions are occurring. When energy of a local transmission is detected at the output of one of the line drivers 2006–2009, the associated transmit flip-flop of the transmission controller is set high, and the circuit 1130 assumes the $S_1$ state. The transmission is assumed to be valid and proceeds until energy ceases to be detected at that driver's output or until energy is also detected at one or more other driver's outputs. If energy ceases to be detected, the set transmit flip-flop is reset to zero and the idle state $S_0$ is resumed. But if energy is detected at more than one driver's output, the collision flip-flop at the output of the two or more monitor 2016 is set and the local collision state $S_2$ is assumed. When energy ceases to be detected at all of the driver's outputs, all flip-flops of the adapter and local collision detector 1130 are reset low and the idle state $S_0$ is resumed.

Figure 7:
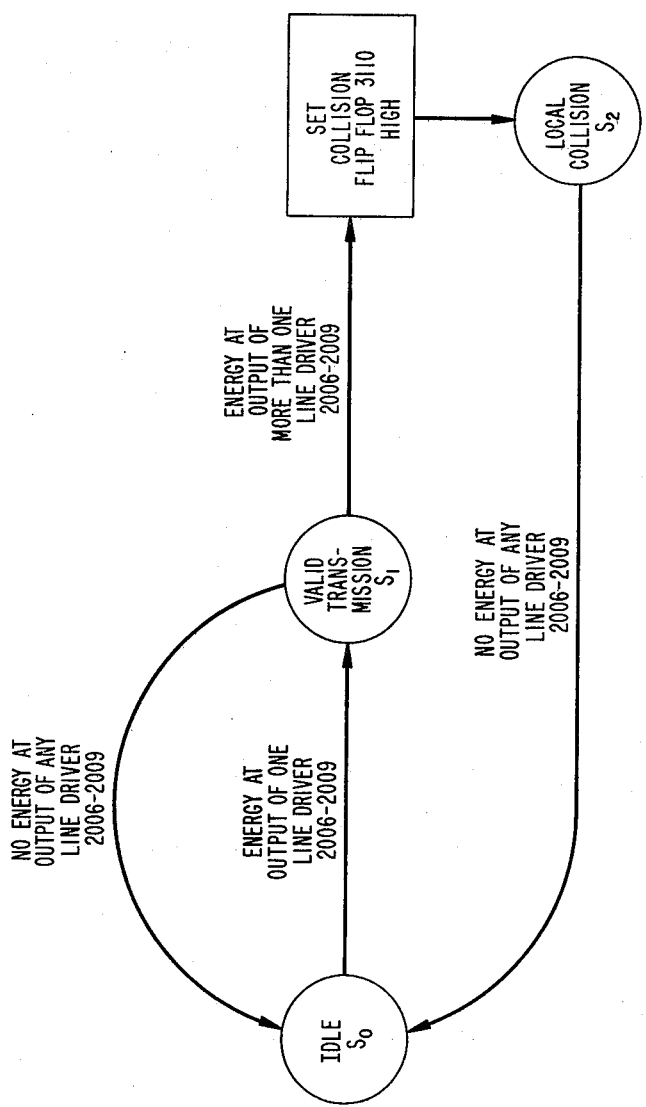
FIG. 7 is a state diagram of the local collision detector of FIG. 4.

The state diagram of FIG. 11 may be compared side-by-side with the state diagram of FIG. 7 which diagrams the operation of the adapter and local collision detector 1130 of FIG. 4. As can be seen from the two state diagrams, the operation of the adapter and detector of FIG. 4 is a simplification of the operation of the adapter and detector of FIG. 8.

Turning now to FIG. 12, there is shown a simplified circuit diagram of the switch 1001 of the interface module 1112. The switch 1001 is representative of the switches of the other interface modules and therefore only the one switch 1001 will be discussed.

The switch 1001 adapts the interface module 1112 for connection to the two transceiver modules 1125 and 1107. The function of the bus switch 1001 is to establish a communications path between the interface stage 1115 and one of the two transceiver modules 1125, 1107. The using device 1127 can therefore be selectively interfaced for communication either to the transceiver 1107 on the bus 1011 or to the transceiver 1125 on the bus 1010 (see FIG. 1). The selection of one of the two communications paths is made through the control line 1002.

The switch 1001 is connected to the "i", "o", and "c" lines (see FIG. 1 of Metcalfe et al.) of the interface stage 1115 (see FIG. 3), to the "o1", "i1", and "c1" lines which connect to the adapter and local collision detector unit 1130 (see FIGS. 4 and 8), and to the lines "o2" "i2", and "c2" which correspond to the lines "o1", "i1", and "c1", respectively, but connect to the transceiver module 1107.

The switch 1001 is controlled by the control line 1002 which provides a control signal to the logic of the switch 1001 that determines to which of the two transceiver modules 1125, 1107 the switch 1001 will establish a communication path at that time.

The control line 1002 is terminated in the input of a line receiver 5004. The output of the line receiver 5004 provides both a control for the logic that couples the data path to the transceiver module 1107, and an input to an inverter 5005 whose output provides a control for the circuitry that couples the data path to the transceiver module 1125.

As shown by FIG. 3, the line "o" leads from the transmitter interface 1171 of the interface stage 1115. The output of the transmitter interface 1171 is connected to the input of a line driver 1174. The output of the line driver 1174 is connected to one end of the line "o". Referring again to FIG. 12, the other end to the line "o" is conected to the input of a line receiver 5001 which amplifies signals present on the "o" line and drives with them an input of each of two "NAND" gates 5002 and 5003. The second input of the gate 5002 connects to the output of the line receiver 5004, and the second input of the gate 5003 connects to the output of the inverter 5005. The output of the gate 5003 is connected to the input of a line driver 5006 whose inverted output drives the line "o1" of transceiver module 1125, the output of the gate 5002 is connected to the input of a line driver 5007 whose inverted output drives the link "o2" of the transceiver module 1107. When the control line 1002 is high, passage of signals from the line "o" is enabled through the gate 5002 to line "o2", but disabled through the gate 5003, thus establishing a communication path to the transceiver module 1107. When the control line 1002 is low, gate 5002 is disabled while gate 5003 is enabled, thus establishing a communication path from the transceiver module 1125.

The lines "i1" and "i2" from the transceiver modules 1125 and 1107, respectively, terminate in the inputs of line receivers 5014 and 5015, respectively, the outputs of which are connected to inputs of "NAND" gates 5016 and 5017, respectively. The other input of the gate 5017 is the output of the line receiver 5004 and the other input of the gate 5016 in the output of the gate 5005. The outputs of the gates 5016 and 5057 form the inputs to a "NAND" gate 5018, the output of which connects to the input of a line driver 5019. The output of the line driver 5019 is connected to one end of the line "i" leading to the receiver interface 1172 of the interface stage 1115 and, as FIG. 3 shows, the other end of the line "i" is connected to the input of a line receiver 1175 whose output connects to the input of the receiver interface 1172. When the control line 1002 is high, passage of signals from the line "i2" is enabled through the gate 5017 and 5018 to the line "i", but passage of signals from the line "i1" is disabled at the gate 5016, thus establishing a communication path to the transceiver module 1107. When the control line 1002 is low, gate 5017 is disabled and gate 5016 is enabled, thus establishing a communication path from the transceiver module 1125.

The logic circuitry for the collision detect lines is the same as just described. The lines "c1" and "c2" from the transceiver modules 1125 and 1107, respectively, terminate in the inputs of line receiver 5008 and 5009, respectively, the outputs of which form inputs to "NAND" gates 5010 and 5011, respectively. The other input of the gate 5011 is the output of the line receiver 5004 and the other input of the gate 5010 is the output of the gate 5005. The outputs of the gates 5010 and 5011 form the inputs of a "NAND" gate 5012, the output of which connects to the input of a line driver 5013. The output of the line driver 5013 is connected to one end of the line "c" leading to the collision backoff control 1173 of the interface stage (see FIG. 3). When the control line 1002 is high, a communications path is established from the transceiver module 1107 through the gate 5011; when the control line 1002 is low, a path is established from the transceiver module 1125 through the gate 5010.

Referring to FIG. 3, at the interface stage 1115 the line "c" connects to the input of a line receiver 1176. The output of the line receiver 1176 is not connected directly to the collision backoff control's input, however. The reason is that the line "c" carries digital signals, while the collision backoff control 1173 operates from DC signals (see Metcalfe et al.). The signals carried by the line "c" are therefore converted into DC signals before connection to the input of the collision backoff control 1173. The output of the line receiver 1176 is connected to the input of a conventional phase-locked loop 1177, which operates at the same frequency as the oscillators 1161 and 2017, and to one input of a conventional phase comparator 1178. The output of the phase-locked loop 1177 is connected to another input of the phase comparator 1178, whose output is connected to the input of the collision backoff control 1173.

The phase-locked loop 1177 continuously generates an output signal at its operating frequency. The phase comparator 1178 compares this signal with signals present at the output of the line receiver 1176 for a match. When no signals are present at the output of the line receiver 1176, there is no match and the phase comparator 1178 generates no output signal. When a signal of the phase-locked loop's operating frequency appears at the output of the line receiver 1176, the phase-locked loop 1177 locks onto this signal and synchronizes its output signal therewith. The phase comparator 1178 detects a match and generates an output DC signal for as long as the match continues to exist.

In a system where the network interface stages already include circuitry that adapts them for operation from digital collision detect signals, the additional phase-locked loop 1177 and phase comparator 1178 are eliminated, and the output of the line receiver 1176 is connected directly to the input of the collision backoff control 1173.

Power for driving the communication system is supplied in the invention from the interface modules of the system. A power converter in each interface stage converts primary power into forms utilizable by system circuitry. Converted power is in part fanned out to each interface module's associated transceiver modules. Each interface stage is alone capable of supplying the power required by the interface module and its associated transceiver modules. In each transceiver module the power inputs from the associated interface modules are combined and the power is converted by power converters for internal use.

In the drawing, the power interconnection is shown for the interface module 1112 and the transceiver module 1125. Power interconnections for other interface modules and other transceivers are substantially the same. As shown in FIG. 3, primary power is input to a power converter 1164 of the interface stage 1115. Any variable primary power source can be used: typical are either 115 VAC or 48 VDC primary power. The power converter 1164 converts the primary power to a form required by the circuitry of the interface stage 1115—typically plus or minus 5 VDC. The power converter 1164 also converts the primary power into a form suitable for distribution to other parts of the system, which is typically 12 VDC, and outputs this power onto an interface power lead "p". The lead "p" generally comprises two conductors: a power conductor, and a return conductor which is usually connected to ground at some common point in the system.

As shown in FIG. 12, the lead "p" is connected to the switch 1001, and there it is fanned out at node 5020 into a power lead "p1" to the transceiver 1125 and into a power lead "p2" to the transceiver 1107. Thus both transceivers 1125 and 1107 are continuously connected to a source of power. The node 5020 is also connected to the input of a power converter 5021 which supplies the power needed locally by the circuit 1001—typically plus or minus 5 VDC.

As shown in FIGS. 4 and 8, the power leads "p1" from the interface modules 1112, 1114, 1117, and 1118 are connected to the adapter and local collision detector 1130, where they are "power ORed" across power diodes 1167, 1168 1169 and 1170, respectively, onto a single transceiver power lead "p". Generally, it suffices to connect only the power conductors across the diodes and to simply tie the return conductors together at the common ground point: hence only four diodes are shown. The transceiver power lead "p" is tapped for connection to a power converter 1166, which converts the received power to a form required by the circuitry of the adapter and local collision detector 1130—typically plus and/or minus 5 VDC.

The transceiver power lead "p" is connected to a power converter 1163 of the transceiver 1111, as shown in FIG. 2. The converter 1163 converts the received power to a form utilizable by various circuits of the transceiver 1111, which is typically again plus or minus 5 VDC. The converter 1163 also supplies the power required to drive the bus 1010, which is conventionally—5 VDC but with an isolated ground. The power supply to the bus 1010 is isolated, i.e., has a separate, generally floating, ground connection, from the power supply to the transceiver circuitry.

Alternatively to the above-described scheme, power in the system can be supplied separately and independently at the transceiver modules and at the interface modules. In such a configuration no power connection is made between the interface modules and the associated transceiver modules, and the power converters of the transceiver modules have as their input a primary power source.

An illustrative example of the operation of the data communication system of FIG. 1 follows.

Initially, the control line 1002 is assumed to be held low, causing the bus switches of all of the interface modules to establish communication paths from the using devices to the transceivers located on the bus 1010. Thus communications within the system proceed across the bus 1010.

For example, the low level of the control line 1002 enables the gates 5003, 5010, and 5016 of the switch 1001, while disabling the gates 5002, 5011, and 5017, and a communication path is thereby established through the switch 1001 of the interface module 1112 between the using device 1127 and the transceiver module 1125. The using devices 1128, 1140, and 1141 are similarly interfaced for communications to the transceiver module 1125 by their respective interface modules. And likewise, the using devices 1142, 1143, 1144, and 1145 are interfaced to the transceiver module 1129, while the using devices 1146 and 1147 are interfaced to the transceiver module 1126.

Communications between using devices within the system can now proceed according to the same protocol and substantially in the same manner as described in Metcalfe et al.

While no communications are occurring over the bus 1010, the system of FIG. 1 is quiescent. In the case of both the FIG. 4 and FIG. 8 embodiment of the adapter and local collision detector 1370, all four "o1" lines are connected to the inputs of the gate 2010.

If at this time data becomes available to an interface module, for example the module 1112, from its using device 1127 for transmission to another using device, the interface stage 1115 processes that data in a conventional manner and properly encodes it, preferably in Manchester format, all in a conventional manner. The transmitter interface 1171 then transfers the data to the transceiver module 1125.

The data passes fromm the transmitter interface 1171 over interface line "o" to the switch 1001, through gate 5003 of the switch 1001, and over the line "o1" of the interface module 1112 to the adapter and local collision detector 1130 of the transceiver 1125. There it is sensed by the energy detector 2012, whose output goes high for the duration of the transmission. But because the other energy detectors of the local collision detector 1370 maintain a low output, the output of the two-or-more monitor 2016 remains low.

If the adapter and local collision detector stage of FIG. 4 is being utilized, all four of the "o1" lines maintain a connection to the gate 2010. If, however, the adapter and local collision detector of FIG. 8 is being utilized, the transmission controller 2511 causes the transmission selector 2510 to break the connection between the gate 2010 and the "o1" lines of the interface modules 1114, 1117, and 1118, allowing only the "o1" line of the interface module 1112 to remain connected to the gate 2010.

But, irrespective of which of the two embodiments of the 1130 circuit is being utilized, the data packet from the interface module 1112 passes through the adapter and local collision detector 1130 to the transmitter 1301 of the transceiver 1111, which transmits it at the tap 1101 onto the bus 1010 for reception at the receivers of all of the transceiver modules connected to the bus 1010, including the receiver 1302 of the transciever module 1125.

The data is treated at the receiver 1302 no differently than had it been a transmission from another transceiver on the bus 1010. The data passes from the receiver 1302 via the transceiver line "i" to the adapter and local collision-detector 1130 and therethrough onto the lines "i1" of the interface modules 1112, 1114, 1117 and 1118. From the line "i1" of the module 1112 the data passes through the gates 5016 and 5018 of the switch 1001 onto the interface line "i", and over that line to the receiver interface 1172 of the interface stage 1115, where it is processed in a conventional manner.

The transmission having ended, the system returns to its initial quiescent state.

Thus, it can be seen that a using device can communicate over the bus 1010 with all other using devices having access to that bus, including using devices interfaced to the same transceiver module.

If the above-mentioned data packet during its journey along the bus 1010 collides with a data packet originating with a using device connected to some other transceiver module, the collision is detected by the remote collision detector 1113 of the transceiver module 1101. The detector 1113 sets its output high for the duration of the collision. The high DC output signal is converted into a "collision detected" digital signal at the gate 1160.

The digital signal passes through the transceiver3 s "c" line to the adapter and local collision detector 1130, and through the gates 2020 and 2021 onto the "c1" lines of the interface modules 1112, 1114, 1117, and 1118. The signal on the "c1" line of the module 1112 passes through the gates 5010 and 5012 of the switch 1001 onto the "c" line of the interface stage 1115. At the interface stage 1115 the digital signal is reconverted into a DC signal by the phase locked loop 1177 and the phase comparator 1178. The DC signal is then sent to the collision backoff control 1173 which responds to it in a conventional manner.

When the colliding transmissions cease, the system returns to its initial quiescent state.

If during the transfer of the above-mentioned data packet from the interface module 1112 onto the bus 1010, one or more of the other interface modules 1114, 1117, and 1118 which are connected to the transceiver module 1125 also commence a transfer of a data packet, a local collision occurs between the plurality of data packets. The local collision is detected by the local collision detector 1370 of the transceiver module 1125, which blocks all signals from the remote collision detector 1113 at the gate 2020, generates its own "collision detected" digital signal, and sends its signal across the "c1" lines to all of the interface modules associated with the transceiver module 1125. There the local "collision detector" digital signal is treated in the same manner as the remote "collision detected" digital signal, as described-above for the example of the interface stage 1115.

If the adapter and local collision detector of FIG. 4 is being utilized, the two or more contemporaneous local data transmissions physically collide and mix at the gate 2010. The mixed, garbled, data passes over the transceiver line "o" into the transmitter 1301 of the transceiver 1111, which transmits the garbled data over the bus 1010 through the tape 1101.

If, however, the adapter and local collision detector of FIG. 8 is being utilized, the second data transmission is blocked from reaching the gate 2010 by the transmission selector 2510 and thus physical collision of the two local transmissions is avoided. Only the data transmission from the interface module 1112 reaches the gate 2010, and passes therethrough ungarbled. The transmission then passes over the transceiver line "o" into the transmitter 1301, which retransmits it over the bus 1010.

The local collision detector 1370 continues to generate a "collision detected" signal for a time equal to the time delay 3111 or until the colliding transmissions cease, whichever is longer. In the case of the FIG. 8 embodiment of the adapter and local collision detector 1130, this "collision detected" signal causes the "o1" lines of the interface modules 1114, 1117, and 1118 to remain disconnected from the inputs of the gate 2010. When the "collision detected" signal ceases to be generated, the system returns to its initial quiescent state.

Should it become desirable to switch communications off of the bus 1010, for example because of a malfunction of the bus or of a transceiver module connected to the bus or because modifications are desired to be made to that branch of the communication system, the control line 1002 is switched high at an appropriate moment in time, for example when no communications are occurring on the bus 1010. This causes the bus switches of all of the interface modules to simultaneously break the communication paths to the transceivers located on the bus 1010, and to establish communication paths to the transceivers located on the bus 1011.

For example, the high level on line 1002 disables the gates 5003, 5010, and 5016 in the switch 1001 of the interface module 1112 and enables the gates 5002, 5011, and 5017, breaking the connections between the interface lines "o", "c", and "i" and the lines "o1", "c1", and "i1" of the transceiver 1125, and instead making connections between the interface lines and the lines "o2", "c2", and "i2" of the transceiver 1107. The using device 1127 thus becomes interfaced for communications to the transceiver 1107 on the bus 1011.

Communications within the system now proceed on the bus 1011 in the manner described above for the bus 1010.

Of course, it should be understood that various changes and modifications to the illustrative embodiment described above will be apparent to those skilled in the art. For example, other remote collision detection schemes than the bit-by-bit comparison of transmitted and received signals disclosed by Metcalfe et al. may be utilized within the system. Or the communication medium may be for example comprised of optical fibers, not coaxial cable. Such changes and modifications can be made without departing from the spirit and the scope of the invention and without diminishing its attendant advantages. It is therefore intended that all such changes and modifications be covered by the following claims.

What is claimed is:

1. An improved data communication system comprising:
    a plurality of substantially duplicative communication media;
    a plurality of transceiver means connected to the plurality of communication media, each transceiver means connected to at least one of the plurality of communication media for communicating across the at least one of the plurality of communication media;
    collision detection means associated with each transceiver means for detecting collisions between a plurality of communications at least one of which involves the associated transceiver means; and
    a plurality of means for interfacing using means and transceiver means for communication, each interface means connected to at least one of the plurality of transceiver means such that the using means have selective communication access via the at least one transceiver means to the plurality of communication media.

2. An improved data communication system comprising:
    a plurality of substantially duplicative communication media;
    a plurality of transceiver means connected to the plurality of communication media, each transceiver means connected to one of the plurality of communication media for communicating across the communication medium;
    collision detection means associated with each transceiver means for detecting collisions between a plurality of communications at least one of which involves the associated transceiver means; and
    a plurality of means for interfacing using means and transceiver means for communication, each interface means connected to a plurality of transceiver means each one of which is connected to a different one of the communication media, such that the using means have selective communication access via the plurality of transceiver means to the plurality of communication media.

3. In an improved data communication system which includes a first communication medium, a plurality of first transceiver means connected to the first medium for communicating across the first medium, and first collision detection means associated with each first transceiver means for detecting collisions between a plurality of communications at least one of which involves the associated first transceiver means, the improvement comprising:
    a second communication medium, substantially duplicative of the first communication medium;
    a plurality of second transceiver means connected to the second communication medium for communicating across the second medium;
    second collision detection means associated with each second transceiver means for detecting collisions between a plurality of communications at least one of which involves the associated second transceiver means; and
    a plurality of means connected to the transceiver means for interfacing using means and transceiver means for communication, each interface means connected to a first and a second transceiver means.

4. The apparatus of claim 1 or 2 or 3 wherein one of the communication media serves as a system service and maintenance communication medium.

5. The apparatus of claim 1 or 2 or 3 wherein the interface means include switching means for selectively simultaneously providing communication paths for the using means to a common at least one of the communication media.

6. The apparatus of claim 5 further providing means for commonly controlling the switching means.

7. The apparatus of claim 1 or 2 or 3 wherein the interface means include switching means for selectively simultaneously providing communication paths between the interface means and a common at least one of the communication media.

8. The apparatus of claim 6 further providing means for commonly controlling the switching means.

9. The apparatus of claim 3 wherein each interface means includes switching means for selectively providing a communication path between the interface means and one of the communication media, and means for causing the plurality of switching means to establish paths to the one of the communication media substantially simultaneously.

10. The apparatus of claim 1 or 2 or 3 wherein at least one transceiver means is adapted for concurrent connection to a plurality of interface means.

11. The apparatus of claim 10 further comprising local collision detection means associated with the at least one transceiver means for detecting collisions between communications of a plurality of using means interfaced to that transceiver means.

12. An improved interface for interfacing using means and transceiver means for communication in a data communication system which includes a plurality of substantially duplicative communication media, a plurality of transceiver means connected to the plurality of communication media with each transceiver means connected to one of the plurality of media for communicating across the medium, and collision detection means associated with each transceiver means for detecting collisions between a plurality of communications at least one of which involves the associated transceiver means, the interface comprising:

means for adapting the interface for connection to a plurality of transceiver means each one of which is connected to a different one of the plurality of communication media, to provide the using means selective communication access via the plurality of transceiver means to the plurality of communication media.

13. An improved interface for interfacing using means and transceiver means for communication in a data communication system which includes a pair of substantially duplicative communication media, a plurality of transceiver means connected to the pair of media with each transceiver means connected to one of the pair of media for communicating across the medium, and collision detection means associated with each transceiver means for detecting collisions between a plurality of communications at least one of which involves the associated transceiver means, the interface comprising:

means for adapting the interface for connection to two transceiver means each one of which is connected to a different one of the two media to provide the using means selective communication access via the two transceiver means to the pair of media.

14. The apparatus of claim 12 or 13 wherein the interface adapting means comprise switching means for selectively establishing a communication path for the using means to at least one communication medium.

15. The apparatus of claim 12 or 13 wherein the interface adapting means comprise switching means for selectively establishing a communication path between the interface and at least one of the connected transceiver means.

16. A switch for a data communication system which includes a plurality of substantially duplicative communication media, a plurality of transceiver means connected to the plurality of communication media with each transceiver means connected to one of the plurality of media for communicating across the medium, collision detection means associated with each transceiver means for detecting collisions between a plurality of communication at least one of which involves the associated transceiver means, and a plurality of means for interfacing using means and transceiver means for communication, the switch comprising:

means for connecting interface means to a plurality of transceiver means each one of which is connected to a different one of the plurality of communication media to provide the using means selective communication access via the plurality of transceiver means to the plurality of communication media.

17. A switch for a data communication system which includes a pair of substantially duplicative communication media, a plurality of transceiver means connected to the pair of media with each transceiver means connected to one of the pair of media for communicating across the medium, collision detection means associated with each transceiver means for detecting collisions between a plurality of communications at least one of which involves the associated transceiver means, and a plurality of means for interfacing using means and transceiver means for communication, the switch comprising:

means for connecting interface means to two transceiver means each one of which is connected to a different one of the pair of media to provide the using means selective communication access via the two transceiver means to the pair of communication media.

18. The apparatus of claim 16 or 17 wherein the connecting means selectively provide a communication path between the interface and one of the connected transceiver means.

19. In an improved data communication system which includes a communication medium, a plurality of transceiver means connected to the medium for communicating across the medium, and remote collision detection means associated with each transceiver means for detecting collisions between a plurality of communications at least one of which involves the associated transceiver means, the improvement comprising:

means associated with at least one transceiver means for adapting the transceiver means for concurrent interfacing for communication with a plurality of using means capable of initiating communications simultaneously.

20. The apparatus of claim 19 further comprising local collision detection means associated with each of the at least one transceiver means for detecting collisions between communications of a plurality of using means interfaced to that transceiver means.

21. In an improved data communication system which includes a communication medium, a plurality of transceiver means connected to the medium for communicating across the medium, and remote collision detection means associated with each transceiver means for detecting collisions between a plurality of communications at least one of which involves the associated transceiver means, the improvement comprising:

a plurality of means capable of initiating communications simultaneously for interfacing using means to the transceiver means for communication, connected to the plurality of transceiver means; and means associated with at least one transceiver means for adapting the transceiver means for concurrent connection to a plurality of interface means.

22. The apparatus of claim 21 further comprising local collision detection means associated with each of the at least one transceiver means for detecting collisions between communications of a plurality of using means interfaced to that transceiver means.

23. The apparatus of claim 22 wherein the local collision detection means include means for preventing locally colliding communications from physically colliding.

24. An improved data communication system comprising:

a communication medium;

a plurality of transceiver means connected to the medium for communicating across the medium, at least one transceiver means having a transmitter input means and a receiver output means;

remote collision detection means associated with each transceiver means for detecting collisions between a plurality of communications at least one of which involves the associated transceiver means, the collision detection means associated with the at least one transceiver means having a remote collision detect output means;

a plurality of means connected to the plurality of transceiver means for interfacing using means to the transceiver means for communication, at least some of the interfacing means having receiver interface input means, transmitter interface output means, and collision backoff control input means; and means associated with the at least one transceiver means for adapting the transceiver means and associated remote collision detection means for concurrent connection to a plurality of interface means, the adapting means comprising means for fanning out the transmitter input means to a plurality of the transmitter interface output means, means for fanning out the receiver output means to a plurality of the receiver interface input means, and means for fanning out the remote collision detect output means to a plurality of the collision backoff control input means.

25. The apparatus of claim 24 further comprising local collision detection means associated with each of the at least one transceiver means for detecting collisions between communications of a plurality of using means interfaced to that transceiver means.

26. The apparatus of claim 25 wherein the local collision detection means comprise:

energy detecting means associated with each of the plurality of transmitter interface output means for detecting communications on the transmitter interface output means;

means for monitoring the plurality of energy detecting means for contemporaneous detection of communications by a plurality of the energy detecting means;

local collision detect output means responsive to the monitoring means for indicating the occurrences of contemporaneous detection; and means for fanning out the local collision detect output means to the plurality of collision backoff control input means.

27. The apparatus of claim 25 wherein the local collision detection means include means for preventing locally colliding communications from physically colliding.

28. The apparatus of claim 26 wherein the local collision detection means further comprise means responsive to the energy detecting means for breaking the fanout connection between the transmitter input means and all but one of the transmitter interface output means upon detection by the energy detecting means of a communication on the one transmitter interface output means.

29. An improved transceiver for a data communication system which includes a communication medium, a plurality of transceiver means connected to the medium for communicating across the medium, and remote collision detection means associated with each transceiver means for detecting collisions between a plurality of communications at least one of which involves the associated transceiver means, the transceiver including the associated remote collision detection means, the transceiver comprising:

means for adapting the transceiver for concurrent interfacing for communications with a plurality of using means capable of initiating communications simultaneously.

30. The apparatus of claim 29 further comprising local collision detection means for detecting collisions between communications of a plurality of using means interfaced to the transceiver.

31. The apparatus of claim 30 wherein the local collision detection means include means for preventing locally colliding communications from physically colliding.

32. An improved transceiver for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the transceiver means for interfacing using means capable of initiating communications simultaneously and transceiver means for communication, the transceiver including the associated remote collision detection means, the transceiver comprising:

means for adapting the transceiver for concurrent connection to a plurality of the interface means.

33. The apparatus of claim 32 further comprising local collision detection means for detecting collisions between communications of a plurality of using means interfaced to the transceiver.

34. The apparatus of claim 33 wherein the local collision detection means include means for preventing locally colliding communications from physically colliding.

35. An improved transceiver for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the plurality of transceiver means for interfacing using means to the transceiver means for communication, at least some of the interfacing means having a receiver interface input means, transmitter interface output means, and collision backoff control input means, the transceiver including the associated remote collision detection means and having transmitter input means, receiver input means, and remote collision detect output means, the transceiver comprising:

means for adapting the transceiver for concurrent connection to a plurality of interface means, comprising means for fanning out the transmitter input means to a plurality of transmitter interface output means, means for fanning out the receiver output means to a plurality of receiver interface input means, means for fanning out the remote collision detect output means to a plurality of collision backoff control input means; and local collision detection means included in the transceiver for detecting collisions between communications of a plurality of using means interfaced to the transceiver, comprising energy detecting means associated with each of the plurality of transmitter interface output means for detecting communications on the transmitter interface output means, means for monitoring the plurality of energy detecting means for contemporaneous detection of communications by a plurality of the energy detecting means, local collision detect output means responsive to the monitoring means for indicating the occurrences of contemporaneous detection, and means for fanning out the local collision detect output means to the plurality of collision backoff control input means.

36. The apparatus of claim 35 wherein the local collision detection means further comprise means responsive to the energy detecting means for breaking the fanout connection between the transmitter input means and all but one of the transmitter interface output means upon detection by the energy detecting means of a communication on the one transmitter interface output means.

37. An adapter and local collision detector for a data communication system which includes a communication medium, a plurality of transceiver means connected to the medium for communicating across the medium, and remote collision detection means associated with each transceiver means for detecting collisions between a plurality of communications at least one of which involves the associated transceiver means, the adapter and local collision detector comprising:

means for adapting transceiver means and associated remote collision detection means for concurrent interfacing for communication with a plurality of using means, and means for detecting collisions between communications of a plurality of using means interfaced to the transceiver means.

38. The apparatus of claim 37 wherein the local collision detection means include means for preventing locally colliding communications from physically colliding.

39. An adapter and local collision detector for a data communication system which includes a communication medium, a plurality of transceiver means connected to the medium for communicating across the medium, remote collision detection means associated with each transceiver means for detecting collisions between a plurality of communications at least one of which involves the associated transceiver means, and a plurality of means connected to the transceiver means for interfacing using means and transceiver means for communication, the adapter and local collision detector comprising:

means for adapting transceiver means and associated remote collision detection means for concurrent connection to a plurality of interface means; and means for detecting a collision between communications of a plurality of using means interfaced to the transceiver means.

40. The apparatus of claim 39 wherein the local collision detection means include means for preventing locally colliding communications from physically colliding.

41. An adapter and local collision detector for a data communication system which includes a communication medium, a plurality of transceiver means connected to the medium for communicating across the medium, at least one transceiver means having a transmitter input means and a receiver output means, remote collision detection means associated with each transceiver means for detecting collisions between a plurality of communications at least one of which involves the associated transceiver means, the remote collision detection means associated with the at least one transceiver means having a remote collision detect output means, and a plurality of means for interfacing using means to the transceiver means for communication, connected to the plurality of transceiver means, at least some of the interface means having receiver interface input means, transmitter interface output means, and collision backoff control input means, the adapter and local collision detector comprising:

means for fanning out the transmitter input means to a plurality of the transmitter interface output means;

means for fanning out the receiver output means to a plurality of the receiver interface input means;

means for fanning out the remote collision detect output means to a plurality of the collision backoff control input means;

energy detecting means associated with each of the plurality of transmitter interface output means for detecting communications on the transmitter interface output means;

means for monitoring the plurality of energy detecting means for contemporaneous detection of communications by a plurality of the energy detecting means;

local collision detect output means responsive to the monitoring means for indicating the occurrences of contemporaneous detection; and means for fanning out the local collision detect output means to the plurality of collision backoff control input means.

42. The apparatus of claim 41 wherein the local collision detection means further comprise means responsive to the energy detecting means for breaking the fanout connection between the transmitter input means and all but one of the transmitter interface output means upon detection by the energy detecting means of a communication on the one transmitter interface output means.

43. An improved data communication system comprising:

a plurality of substantially duplicative communication media;

a plurality of transceiver means connected to the plurality of communication media, each transceiver means connected to one of the plurality of communication media for communicating across the communication medium;

remote collision detection means associated with each transceiver means for detecting collisions between a plurality of communications at least one of which involves the associated transceiver means;

a plurality of means for interfacing using means and transceiver means for communication, each interface means connected to a plurality of transceiver means each one of which is connected to a different one of the communication media, such that the using means has selective communication access via the plurality of transceiver means to the plurality of communication media; and means associated with at least one of the transceiver means for adapting the transceiver means for concurrent connection with a plurality of interface means.

44. The apparatus of claim 43 further comprising local collision detection means associated with each of the at least one transceiver means for detecting collisions between communications of a plurality of using means interfaced to that transceiver means.

45. The apparatus of claim 44 wherein the local collision detection means include means for preventing locally colliding communications from physically colliding.

46. An improved data communication system comprising:
- a pair of substantially duplicative communication media;
- a plurality of transceiver means connected to the pair of media, each transceiver means connected to one of the pair of media for communicating across the medium, at least one transceiver means having a transmitter input means and a receiver output means,
- remote collision detection means associated with each transceiver means for detecting collisions between a plurality of communications at least one of which involves the associated transceiver means, the remote collision detection means associated with the at least one transceiver means having a remote collision detect output means;
- a plurality of means for interfacing using means and transceiver means for communication, each interface means connected to a pair of transceiver means each one of which is connected to a different one of the pair of communication media, at least some of the interface means having receiver interface input means, transmitter interface output means, and collision backoff control input means,
- means associated with the at least one transceiver for adapting transceiver means and associated medium collision detector means for concurrent connection to a plurality of interface means, the adapting means comprising
  - means for fanning out the transmitter input means to a plurality of transmitter interface output means,
  - means for fanning out the receiver output means to a plurality of receiver interface input means, and
  - means for fanning out the remote collision detect output means to a plurality of collision backoff control input means; and
- local collision detection means associated with each of the at least one transceiver means for detecting collisions between communications of a plurality of using means interfaced to that transceiver means, comprising
  - energy detecting means associated with each of the plurality of transmitter interface output means for detecting communications on the transmitter interface output means,
  - means for monitoring the plurality of energy detecting means for contemporaneous detection of communications by at least two of the energy detecting means,
  - local collision detect output means responsive to the monitoring means for indicating the occurrences of contemporaneous detections, and
  - means for fanning out the local collision detect output means to the plurality of collision backoff control input means.

47. The apparatus of claim 46 wherein the local collision detection means further comprise means responsive to the energy detecting means for breaking the fanout connection between the transmitter input means and all but one of the transmitter interface output means upon detection by the energy detecting means of a communication on the one transmitter interface output means.

* * * * *

UNITED STATES PATENT AND TRADEMARK OFFICE
CERTIFICATE OF CORRECTION

PATENT NO. : 4,464,658

DATED : August 7, 1984

INVENTOR(S) : William Thelen

It is certified that error appears in the above-identified patent and that said Letters Patent is hereby corrected as shown below:

Column 12, line 63, "gae" should read --gate--, Column 14, line 42, "5057" should read --5017--, Column 15, line 64, "variable" should read --available--, Column 18, line 6, "tranceiver3 s" should read --transceiver's--.

On the title page,

In the assignee name, "AT&T Laboratories" should read --AT&T Bell Laboratories--.

Signed and Sealed this

Twelfth Day of March 1985

[SEAL]

Attest:

DONALD J. QUIGG

Attesting Officer

Acting Commissioner of Patents and Trademarks